United States Patent [19]
Endoh et al.

[11] Patent Number: 4,894,972
[45] Date of Patent: Jan. 23, 1990

[54] WINDOW ASSEMBLY AND METHOD OF PRODUCING SAME

[75] Inventors: Masato Endoh, Tokyo; Masayoshi Ohgoshi, Yokohama; Yoshio Horiki, Matsusaka, all of Japan

[73] Assignee: Central Glass Company, Limited, Ube, Japan

[21] Appl. No.: 134,093

[22] Filed: Dec. 17, 1987

[30] Foreign Application Priority Data

| Dec. 19, 1986 | [JP] | Japan | 61-301414 |
| Dec. 19, 1986 | [JP] | Japan | 61-194491[U] |
| Dec. 23, 1986 | [JP] | Japan | 61-305280 |
| Dec. 23, 1986 | [JP] | Japan | 61-305281 |
| Dec. 23, 1986 | [JP] | Japan | 61-305282 |

[51] Int. Cl.⁴ ............................. B60J 1/02; E06B 3/54
[52] U.S. Cl. ........................................ 52/716; 52/208; 296/84.1; 296/146
[58] Field of Search ................. 52/397, 208, 716; 296/84.1, 146

[56] References Cited

U.S. PATENT DOCUMENTS

| 3,968,612 | 7/1976 | Endo | 52/208 |
| 4,436,337 | 3/1984 | Bowes | 52/208 |
| 4,568,119 | 2/1986 | Minami | 52/208 |
| 4,621,469 | 11/1986 | Kruschwitz | 52/397 |
| 4,700,525 | 10/1987 | Nieboer | 52/208 |
| 4,712,341 | 12/1987 | Harris | 52/208 |

FOREIGN PATENT DOCUMENTS

| 0076924 | 4/1983 | European Pat. Off. . |
| 53-118226 | 9/1978 | Japan . |
| 54-100022 | 8/1979 | Japan . |
| 60-104412 | 6/1985 | Japan . |
| 61-30416 | 2/1986 | Japan . |
| 617368 | 3/1986 | Japan . |
| 61-66645 | 4/1986 | Japan . |
| 61-64013 | 5/1986 | Japan . |
| 61-158508 | 10/1986 | Japan . |
| 1523547 | 9/1978 | United Kingdom . |
| 2147244 | 5/1985 | United Kingdom . |

Primary Examiner—John E. Murtagh
Attorney, Agent, or Firm—Fleit, Jacobson, Cohn, Price, Holman & Stern

[57] ABSTRACT

A window assembly to be installed to an automotive vehicle body, and a production method of the same. The window assembly is comprised of a plastic molding securely formed at the peripheral section of a transparent glass plate such as a windshield glass of an automotive vehicle, along the whole periphery of the glass plate. The molding is integrally formed with a flange-section tightly cotractable with the surface of an outer panel of the vehicle body, and a projection securely fittable with the vehicle body outer panel when the window assembly is installed to the vehicle body. The molding is further formed with a depression for effectively retaining adhesive between the molding and the vehicle body outer panel. Such a window assembly is produced by setting the peripheral section of the plate glass in a predetermined position in a mold having a cavity, and thereafter injecting molten plastic into the mold cavity thereby to integrally mold the molding with the plate glass in such a manner that the glass plate peripheral section is inserted in the molding.

29 Claims, 5 Drawing Sheets

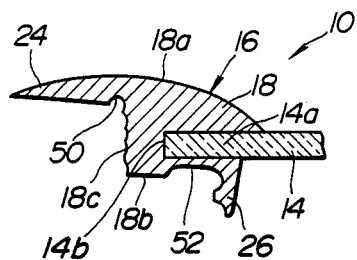
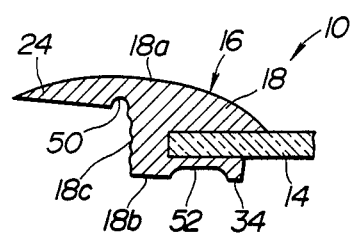
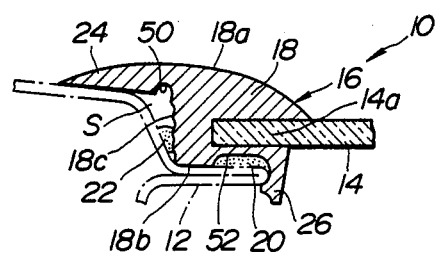
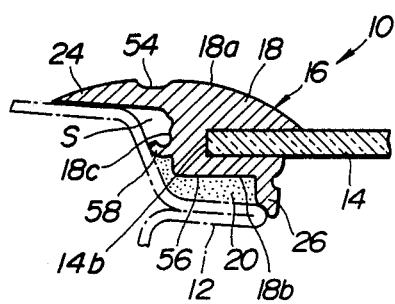
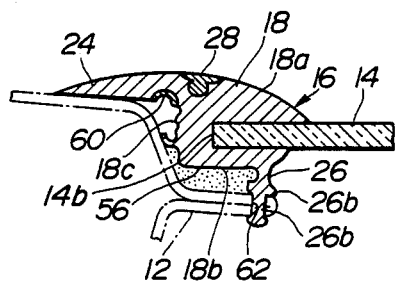

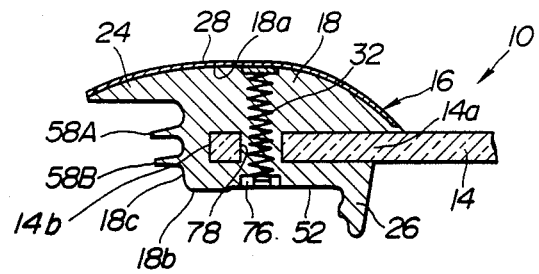
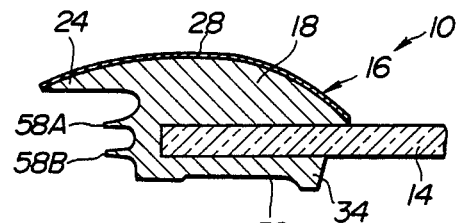
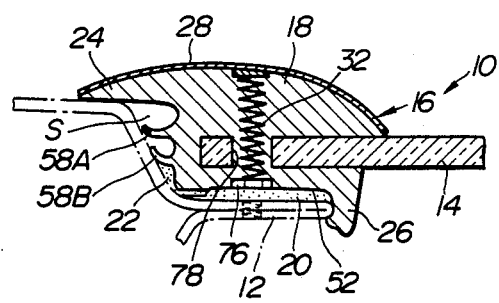
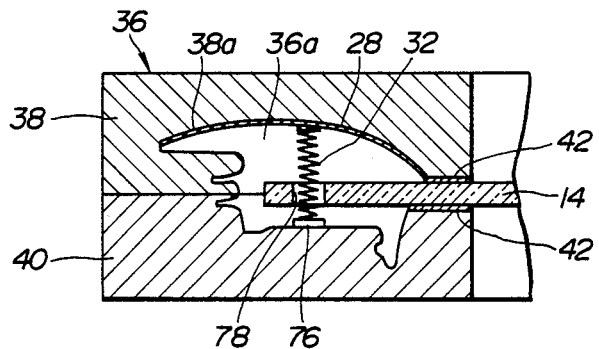

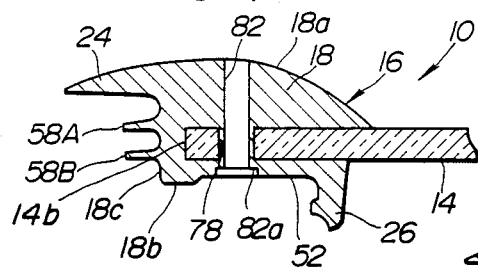
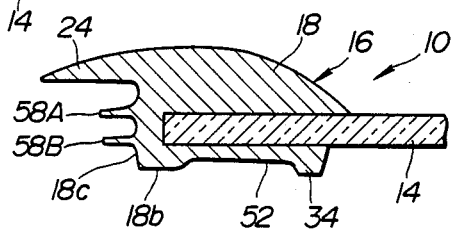
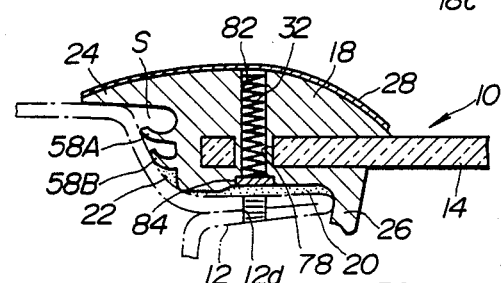
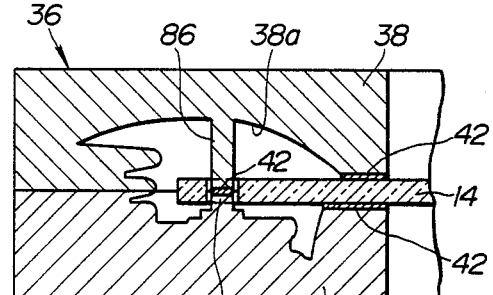
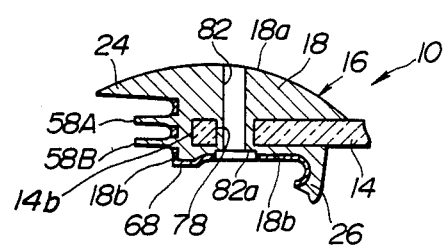
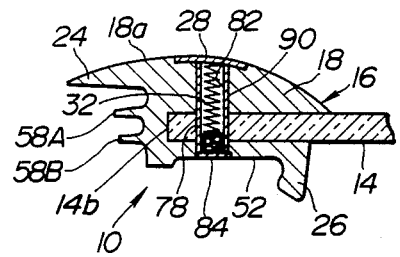

WINDOW ASSEMBLY AND METHOD OF PRODUCING SAME

BACKGROUND OF THE INVENTION

1. Field of the Invention

This invention relates to an architectural window structure, a vehicular window structure or the like and a method of producing the same, and more particularly to an automotive vehicle window assembly of the type wherein a molding or gasket made of plastic is integrally molded with the peripheral section of a transparent plate member and a method of producing the same.

2. Description of the Prior Art

Hitherto many methods for installing a window glass or a windshield glass to an automotive vehicle body outer panel have been proposed and put into practical use. For example, a plate glass is fitted to the joint section of the inner and outer panels of the vehicle body through a separately molded weather strip fitted to both the joint section and the plate glass. Otherwise, in a so-called direct grazing method, a peripheral molding having a leg section is used in which the leg section is inserted into between a plate glass and the flange section of a vehicle body panel and fixed in position with adhesive. Additionally, recent attention has been paid to a so-called encapsulation method in which a mold or gasket is previously molded integrally with the peripheral section of the plate glass by reaction injection molding method or the like thereby to form a window assembly, and thereafter the window assembly is installed to the vehicle body in such a manner that the mold or gasket is fitted to the vehicle body outer panel.

Such encapsulation method is disclosed, for example, in Japanese Patent Provisional Publications Nos. 54-100022, 60-104412, 61-66645. However, window assemblies produced by the above-mentioned encapsulation methods disclosed in the Publications require separate parts and jigs for accomplishing precise location of the window assembly relative to the vehicle body at a predetermined position and for securely fitting the molding of the window assembly to the vehicle body outer panel maintaining sealing, thus increasing the number of component parts while complicating assembly operation of an automotive vehicle.

SUMMARY OF THE INVENTION

A window assembly of the present invention is adapted to securely installed to a support body and comprises a transparent plate member. A frame member made of plastic is integrally molded with the peripheral section of the plate member in such a manner that the plate member peripheral section is inserted in the frame member. The frame member is so shaped as to accomplish location of the frame member relative to the support body and to allow the frame member to be fitted with the support body, and to allow at least a part of the frame member to tightly contact with surface of the support body. The frame member is further so shaped that a space for adhesive is formed between the frame member and the support body.

Such a window assembly may be produced by the following method: First, a mold is prepared in such a manner as to have a cavity which is shaped as to form the frame member provided with means for accomplishing location of the frame member relative to the support body and for allowing the frame member to be fitted with the support body, means for allowing at least a part of the frame member to tightly contact with the surface of the support body, and means defining a space for adhesive between the frame member and the support body. Second, a sealing member is attached to the mold in such a position as to be contactable with the plate member when the mold is closed. Third, the mold is closed in such a manner that the sealing member is brought into contact with the plate member. Fourthly, material of plastic is injected into the mold cavity thereby to mold the frame member integral with the plate member. Lastly, the molded frame member integral with the plate member is taken out from the mold upon opening the mold after solidification of the plastic.

Thus, the frame member of the window assembly of the present invention is integrally provided with means for accomplishing location of the frame member relative to the support body and for allowing the frame member to be fitted with the support body, means for allowing at least a part of the frame member to tightly contact with the surface of the support body, and additionally means for defining the space retaining adhesive therein. This enables the window assembly to be installed to the support body without using any other separate parts and jigs, while maintaining liquid-tight seal between the it and the support body. Such installation of the window assembly is achieved merely by pressing the window assembly frame member to the support body at a predetermined position upon applying adhesive, thereby reducing the number of component parts of the window assembly and simplifying assembly process of the same.

BRIEF DESCRIPTION OF THE DRAWINGS

In the drawings, same reference numerals and characters designate same elements and parts throughout all figures, in which:

FIG. 5 is a fragmentary sectional view of a third embodiment of the window assembly according to the present invention along a vertical plane on which a frame member projection reside;

FIG. 6 is a fragmentary sectional view of the window assembly of FIG. 5 along a vertical plane on which the projection resides;

FIG. 7 is a fragmentary sectional view of the window assembly of FIG. 5 in a state the window assembly is installed to the support member;

FIG. 8 is a fragmentary sectional view similar to FIG. 7 but showing a fourth embodiment of the window assembly according to the present invention;

FIG. 9 is a fragmentary sectional view similar to FIG. 7 but showing a fifth embodiment of the window assembly according to the present invention;

FIG. 15 is a fragmentary sectional view of a ninth embodiment of the window assembly according to the present invention along a vertical plane on which a spring and a projection reside;

FIG. 16 is a fragmentary sectional view of the ninth embodiment window assembly of FIG. 15 along a vertical plane on which the spring and the projection reside;

FIG. 17 is a fragmentary sectional view similar to FIG. 15 but showing a state in which the ninth embodiment window assembly is installed to the support body;

FIG. 18 is a fragmentary sectional view showing a method of producing the ninth embodiment window assembly of FIG. 15 in a state a transparent plate member is set in a mold and immediately before injection of molten plastic;

FIG. 19 is a fragmentary sectional view of a tenth embodiment of the window assembly according to the present invention along a vertical plane on which a through-hole and a frame member projection reside;

FIG. 20 is a fragmentary sectional view of the tenth embodiment of the window assembly of FIG. 19 along a vertical plane on which no through-hole and projection reside;

FIG. 21 is a fragmentary sectional view similar to FIG. 19 but showing a state in which the tenth embodiment window assembly is installed to the support member in which a decorative or reinforcement member is installed to the frame member under bias of a spring;

FIG. 22 is a fragmentary sectional view showing a method of producing the tenth embodiment window assembly in accordance with the present invention in a state a transparent member is set in a mold and immediately before injection of molten plastic;

FIG. 23 is a fragmentary sectional view similar to FIG. 19 but showing an eleventh embodiment of the window assembly according to the present invention; and FIG. 24 is a fragmentary sectional view similar to FIG. 19 but showing a twelfth embodiment of the window assembly according to the present invention.

DETAILED DESCRIPTION OF THE INVENTION

Figure 1:
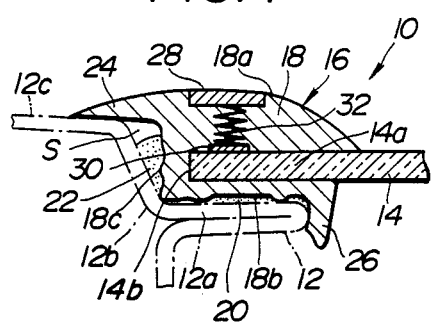
FIG. 1 is a fragmentary sectional view of a first embodiment of a window assembly according to the present invention along a vertical plane on which a spring and a frame member projection reside and in a state the window assembly is installed to a support body.
Figure 2:
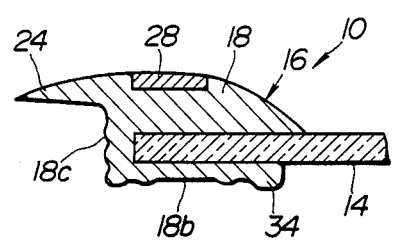
FIG. 2 is a fragmentary sectional view of the first embodiment window assembly of FIG. 1 along a vertical plane on which no spring and frame member projection reside.

Referring now to FIGS. 1 and 2, there is shown a first embodiment of a window assembly 10 in accordance with the present invention. The window assembly 10 of this embodiment is a windshield assembly of an automotive vehicle and will be securely fitted with a support body or vehicle body outer panel, more specifically with an inner peripheral section of an opening for a windshield glass of the vehicle body outer panel. The window assembly 10 is comprised of a transparent plate member or windshied glass 14. A frame member or molding (gasket) 16 made of plastic or synthetic resin is integrally molded with the peripheral section 14a of the plate member 12, i.e., the plate member peripheral section 14a is inserted in the frame member 16. The frame member 14 extends along the whole periphery of the plate member 14 and includes a main body section 18 having a generally C-shaped cross-section so as to surround the plate member peripheral section 12a including an outer peripheral edge 14b. The outer surface 18a of the main body section 18 is formed curved and smooth, while the backside or inner surface 18b of the same is formed uneven and/or depressed and supported on the surface of a flat flange section 12a of the support body 12. Adhesive 20 is to be supplied into between the main body backside surface 18b and the support body flat flange section 12a. In this connection, the uneven and/or depressed shape of the main body section backside surface 18b improves the adhesion effect of the adhesive 20. The side surface 18c of the main body section 18 is formed generally straight so as to define a space S between it and the inclined plate section 12b of the support body 12. Adhesive 22 is to be supplied into the space S thereby to bond the frame member 16 to the support member 12. In this connection, the main body section side surface 18c is formed uneven to improve the adhesive effect of thè adhesive 22. It is to be noted that there is a certain distance between the side surface 18c and the peripheral edge 14b of the plate member 14 to form a wall to protect the peripheral edge 14b from striking against the support body 12.

The frame member main body section 18 is integrally formed with a flange-like or tongue-like section 24 which projects laterally outwardly (in the drawing) and generally in parallel with the plate member 14. The flange-like section 24 extends along the length of the frame member 16 and has an outer surface flush with the outer surface 18a of the main body section 18 so as to form a curved outer surface of the frame member 16. The backside surface of the flange-like section 24 is formed flat so as to be tightly contact with the surface of the flat plate section 12c of the support body 12. As shown, the generally right angle in cross-section is formed between the backside surface of the flange-like section 24 and the main body section side surface 18c. Additionally, the flange member main body section 18 is integrally formed with a projection or engaging rib section 26 which projects downwardly (in the drawing) to be fitted with edge portion of the support body flange section 12a. Thus, the projection 26 functions to accomplish location of the window assembly 10 during installation of the window assembly 10 to the support body 12 and temporary fixation of the window assembly 10 before solidification of the adhesive, also serving as an auxiliary fastening member for the window assembly 10 after solidification of the adhesive. The flame member main body section 18 may be formed at its outer surface with a groove (not shown) through which an excessive amount of the adhesive 20 can move into the space S between the main body section side surface 18c and the support member inclined plate section 12b.

A decorative or reinforcement member 28 is embedded in the frame member 16 such that its outer surface is exposed and flush with the outer surface of the frame member 16. A mount member 30 is disposed on the surface of the plate member 14 and may be bonded to the plate member 14. A spring 32 is interposed between the decorative or reinforcement member 28 and the mount member 30. Thus, the spring 32 and the mount member 30 are embedded in the frame member together with the decorative or reinforcement member 28. While the decorative or reinforcement member 28 has been shown as forming part of the outer surface of the frame member 16, it will be understood that it may cover the whole outer surface of the frame member 16. Although the spring 32 and the projection 26 have been shown as being located near or on the same vertical plane (in the drawing), it will be understood that they may be located respectively at separate positions. However, it is preferable that the spring 32 and the projection 26 are located on the same vertical plane from the view point of balance of loads applied to the plate member. Additionally, it is preferable to provide one or more projections 26 and springs 32.

The window assembly in a plane in which the projection 26 and the spring 32 do not reside is shown in FIG. 2. The frame member main body section 18 is formed at its backside surface 18b with a dam section 34 located in a cross-sectional position corresponding to the projection 26 in order to prevent adhesive 20 to move out of a clearance between the frame member 16 and the support body 12. The projection 26 may be formed extending along the length of the frame member 16; however, it is preferable to form one or more projections 26 from the view point of saving the amount of plastic and weight-lightening of the window assembly 10.

The method of production of the window assembly 10 shown in FIGS. 1 and 2 will be discussed with reference to FIG. 3 which shows a state in which the peripheral section of the transparent plate member 14, the decorative or reinforcement member 28, the spring 32 and the mount member 30 are set in a metallic mold 36 and immediately before injection (pouring) of molten plastic or liquid raw materials of plastic. The metallic mold 36 includes upper and lower molds 38, 40 which are arranged to be separated from each other to open the mold 36 and brought into contact with each other to close the mold 36 by means of an operating mechanism (not shown).

First, the mold 36 is opened to separate the upper and lower molds 38, 40 from each other. Then, the transparent plate member 14 is suitably mounted through a sealing member (damping material) 42 on the lower mold 40. The mount member 30, the spring 32 and the decorative or reinforcement member 28 are set respectively at predetermined positions in such a manner that the decorative or reinforcement member 28 is slightly biased against the inner surface 38a of the upper mold 38 by the spring 32. Thereafter, the upper mold 38 is lowered to contact through a sealing member 42 with the transparent plate member 14, so that the plate member 14 is clamped with the upper and lower molds 38, 40. Thus, a mold cavity 36a is formed between the upper and lower molds 38, 40, thereby completing the setting immediately before injection of molten plastic or the like. In this state, molten plastic is injected or poured into the cavity 36a to accomplish integral molding of the frame member 16 with the transparent plate member 14 in such a manner that the peripheral section of the plate member 14 is inserted in the plastic frame member 16. As a result, the peripheral section of the plate member 14 and the frame member 16 are fixedly and integrally secured with each other. After solidification of the plastic, the metallic mold 36 is opened so that the upper and lower molds 38, 40 are separate from each other in order to take out the molded window assembly 10 from mold 36, thus obtaining the window assembly 10 as shown in FIGS. 1 and 2. It will be understood that the upper and lower molds 38, 40 are adapted to be controlled in temperature and kept at suitable temperatures, respectively, though not shown. Additionally, it will be appreciated that the molten plastic or plastic raw materials is injected or poured into the mold cavity 36a from one or more inlet openings for molten plastic.

Here, the above-mentioned transparent plate member 14 includes a translucent plate member, a coloured plate member, or such a plate member whose surface is formed uneven, in addition to the real transparent one. Accordingly, meant by the "transparent plate member" is inorganic plate glass (including sheet glass and curved glass), plastic plate, laminated glass prepared by combination of plate glass and plastic plate, or the like which are to be used as architectural structure, vehicle window structure such as a windshield glass, a front window glass, a rear window glass, a door glass or the like of an automotive vehicle. Examples of the inorganic plate glass are flat plate glass, plate glass tempered under heat treatment or chemical treatment, coated glass whose surface is coated with a heat-reflecting film or a crack preventing film, a glass plate whose surface is treated to form a black frame, curved glass plate, and insulated glass unit. Examples of the plastic plate are plate made of polycarbonate or acrylic resin, and plastic plate hard-coated to improve scratch resistance.

The above-mentioned frame member 16 such as the molding or gasket is formed along the whole or almost whole periphery of the plate member 14. A variety of cross-sectional shapes of the frame member 16 can be adopted in which the frame member 16 is molded integral with at least one of the right and backside surfaces and the edge surface of the peripheral section of the plate member 14. It is preferable to apply primer to the predetermined locations of the plate member 14 previous to integral molding of the frame member 16 with the plate member 14 in order to improve adhesion force of the plastic frame member 16 to the plate member 14. The outer surface of the frame member 16 is formed into the aerodynamic shape to prevent generation uncomfortable whistling air turbulence noise. The frame member 16 is preferably formed with the flange-like or tongue like section 24 to improve sealing ability between the window assembly 10 and the support body 12 such as the vehicle body outer panel. In this connection, the backside surface of the flange-like section 24 is formed smooth to be brought into tight contact with the outer surface of the support body 12. The flange-like section 24 may be so formed as to provide any spring effect to be biased to the support body 12. A flexible hollow tube (not shown) may be embedded in the frame member 16 in such a manner as to be exposed or projected from the side surface 18c of the frame member main body section 18, thereby improving sealing ability of the frame member 16 to the support body 12. The surface of the frame member 16 facing the support body 12 are formed uneven or depressed for the purpose of securely retaining bead-like adhesive applied thereto. Additionally, the dam section 34 is provided to prevent the applied adhesive from getting away. It is preferable to provide one or more projections 26 for the purpose of effectively locating the window assembly 10 to the support body 20 such as an opening section of the vehicle body outer panel, temporarily fixing the same before the solidification of the adhesive, and assisting permanent fixture of the same after solidification of the adhesive.

With regard to the production method of the window assembly 10, a variety of general plastic fabrication methods such as injection molding can be used for fabricating the frame member 16. Examples of the injection molding are RIM (Reaction Injection Molding), R-RIM (Reinforced Reaction Injection Molding) in which blending reinforcing material into plastic is preferable), LIM (Liquid Injection Molding), and R-LIM (Reinforced Liquid Injection Molding) in which blending reinforcing material into plastic is preferable. Of these injection moldings, RIM is preferable for the reason why it is sufficient that the temperature of the mold surrounding the cavity 36a is within a lower range from ordinary temperature to 100° C., preferably a range from 50 to 80° C. during molding of the frame member 16. In this connection, a considerably high temperature range, for example, from about 200 to 300° C. is usually required in fabrication methods other than the above-listed. Additionally, it is preferable to regulate the temperature of portions of the mold other than portion surrounding the cavity 36a in order to control the solidification rate of the plastic injected into the cavity 36a. It is sufficient that the injection pressure at which the plastic or the plastic raw materials is injected into the mold cavity 36a is within lower range from ordinary pressure to about 6 kg/cm$^2$, preferably around about 3 kg/cm$^2$. In this connection, a high injection pressure, for example, within a range of from 350 to 1000 kg/cm$^2$ is usually required in fabrication methods other than the above-listed. Thus, in plastic fabrication according to RIM, two plastic components or raw materials can be injected into the mold cavity 36a under a considerably low pressure and mixed with each other to carry out reaction of them.

The above-mentioned mold 36 is made of metal, resin, or ceramic as usual. The mold inner surface 38a defining the cavity 36a is treated with mold releasing agent as usual. Furthermore, the sealing member 42 is made of a material different from the plastic to be injected into the cavity 36a and serves also as a shock absorbing member for the purpose of preventing the plate member from being scratched and damaged, preventing bur from production and absorbing the deformation of the plate member 14. Examples of the material of the sealing member 42 are heat-resistant fluororesion, fluororubber, silicone resion, silicone rubber, and other resilient plastics. The sealing member 42 is in the form of solid, foam, hollow body, or combined body.

The above-mentioned decorative or reinforcement member 28 is made of metal or plastic and of the shape of film, plate, elongate band, nut or the like. Thus, as the reinforcement member 28, ones having various sizes, thicknesses and shapes can be used. Since the decorative or reinforcement member 28 is set in position under the bias of the spring 32 in timed relation to closure of the metallic mold 35 without any special effort, it is securely fixed within the mold cavity 36a and relative to the plate member 14 while effectively absorbing distorsion of the mold 36, the plate member 14, and the like. Furthermore, the spring 32 serves to prevent the decorative or reinforcement member 28 from shifting from its predetermined position even during injection of the plastic into the mold cavity 36a, thereby accomplishing precise location of the decorative or reinforcement member 28. It will be understood that the biasing force of the spring 32 may be removed by the resin after solidification of the molten resin fed to the mold cavity 36a. The biasing force of the spring 32 is freely selectable in accordance with the plastic to be used. Additionally, the material and the kind of the spring 32 is also selectable.

Examples of the above-mentioned plastic as the material of the frame member 16 are thermoplastic resin such as polyurethane resin, high or low density polyethylene, polystyrene, polypropylene, silicone resin, polyamide resin, nylon 6, EVA, PET, PBT and the like; thermoplastic rubber such as polyurethane rubber, ethylene vinyl acetate rubber, polyoleffine rubber, stylene butadiene rubber; and thermosetting resin such as vinyl ester resin, epoxy resin, silicone resin, unsaturated polyester resin. Furthermore, blended resin, polyurethane foam, elastomer, and elastic rubber may be widely used as the material of the frame member 16. It will be understood that fillers such as ultraviolet ray absorbing agent, catalyst for controlling reaction rate of plastic, foaming agent, stabilizer; and reinforcing agent such as glass fiber and glass flake may be added to the plastic as the material of the frame member 16. These decide the degree of elasticity of the frame member 16 under combination of the biasing force of the spring 32 to contribute to improvement in weatherability, heat resistance, strength, coefficient of thermal expansion, contraction rate, surface characteristics and the like.

As appreciated from the above, according to the present invention, installation of the window assembly 10 to the support member 12 can be securely and precisely accomplished while improving sealing ability of the window assembly 10 to the support member 12. In case of an automotive vehicle in which the support member 12 is the vehicle body outer panel, the window assembly 10 can be such formed as to satisfy aerodynamic requirements thereby to prevent generation of uncomfortable whistling air turbulence noise. Thus, the window assembly 10 of the present invention contributes to improvement in fuel economy, rain water penetration prevention effect, accumulation prevention effect of dust and the like, appearance quality, and weatherability. Since location of the window assembly 10 is largely facilitated during installation thereof, impact can be softened, preventing development of stress in the window assembly. This enables robotization of installation of the window assembly 10 while obtaining a satisfied life of the window assembly 10. This also prevents the transparent plate member 14 from being scratched and/or damaged while economically improving the window assembly 10.

According to the embodiment of FIGS. 1 and 2, by virtue of the spring 32, the decorative or reinforcement member 28 is securely located in position within the metallic mold 36 and maintained in position without applying excessive load onto the transparent plate member 14 while absorbing distortion and the like of the mold 36 and the transparent plate member 14. This prevents the decorative or reinforcement member 28 from shifting from its predetermined position during injection or pouring of molten plastic while preventing production of bur on the decorative or reinforcement member 28. Since the size, thickness and shape of the decorative or reinforcement member 28 is selectable to be integrally molded by virtue of biasing force of the spring 32, no dispersion will be made in finishing and location precisions. Additionally, installation and attaching operations of component parts of the window assembly 10 are made unnecessary after fitting the window assembly to the support body or vehicle body outer panel, and therefore assembly operation is considerably facilitated, accomplishing fine finishing of the window assembly. Furtheremore, since the physical properties of the resin as the material of the frame member 16 can be made sufficiently effective, more functional moldings or gaskets as the frame member can be widely and freely selectable. For example, by increasing elasticity of the molding or gasket itself, the window assembly 10 can be cope with dispersion in surface inclination precision and distortion of the window assembly 10 and the support body 12 or the vehicle body outer panel, thereby improving sealing ability and adhesion and fixing ability between the window assembly 10 and the support member 12. This improves water sealing ability and air sealing ability, while increasing retension force for and durability of the transparent plate member.

Figure 3:
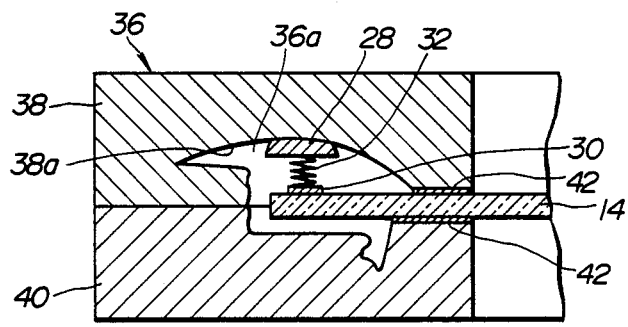
FIG. 3 is a fragmentary sectional view showing a method of producing the first embodiment window assembly in accordance with the present invention in a state a transparent plate member is set in a mold and immediately before injection of molten plastic.
Figure 4:
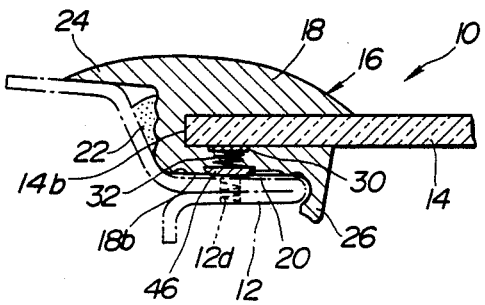
FIG. 4 is a fragmentary sectional view of a second embodiment of a window assembly according to the present invention in a state the window assembly is installed to the support body.

FIG. 4 illustrates a second embodiment of the window assembly 10 according to the present invention, which is similar to the first embodiment with the exception that a fastening member 46 is used instead of the decorative or reinforcement member 28. In this embodiment, the spring 32 is disposed between the mount member 30 and the fastening member 46. The mount member 30 is in contact with the backside surface of the transparent plate member 14. The fastening member 46 is so located as to be exposed at the backside surface 18b of the main body section 18 of the frame member 16. During molding, the fastening member 46 is biased to the surface of cavity 36a of the lower mold 40 as shown in FIG. 3. The fastening member 46 is made of a material for enhancing the adhesion force of the adhesive 20 between the frame member 16 and the support member 12. The fastening member 46 may be a bolt or the like which is screwed into a through-hole 12d formed in the support body 12 as indicated in phantom. It will be understood that the fastening member 46 further enhances fixation of the window assembly 10 to the support body 12.

FIGS. 5 and 6 illustrate a third embodiment of the window assembly 10 according to the present invention, similar to the first embodiment with the exception that the decorative or reinforcement member 28 and the spring 32 are not used. In this embodiment, the flange-like section 24 is formed at its backside surface with a groove 50 located near the side surface 18c of the main body section 18 of the frame member 16. In other words, the groove 50 is formed at the base part of the flange section 24 which part is integral with the main body part 18. The groove 50 extends in the longitudinal direction of the frame member 16. Additionally, the main body section 18 is formed at its backside surface 18b with a depression 52 for retaining adhesive 20 as shown in FIG. 7.

With this arrangement, by virtue of the groove 50 in the frame member flange-like section 24, the flange-like section 24 exhibits flexibility or spring-elasticity. This allow the flange-like section 24 to tightly contact with the outer surface of the support body 12 such as the vehicle body outer panel even if the outer surface is deformed or uneven, thereby improving liquid and air-tight seal of the frame member to the support member, resulting in absorption of dispersion in precision of the transparent plate member and the frame member. It will be understood that the window assembly 10 of this embodiment is produced by a method using an arrangement similar to that shown in FIG. 3.

FIG. 8 illustrates a fourth embodiment of the window assembly according to the present invention, similar to the third embodiment with the exception that a relatively wide groove 54 is formed instead of the groove 50. The groove 54 is formed on the outer surface of the flange like section 24 at the base part which integral with the main body section 18. The groove 54 extends in the longitudinal direction of the frame member 16. It will be understood that the groove 54 provides spring-elasticity to the flange-like section 24 so that the flange-like section 24 tightly contacts with the surface of the support body 12. In this embodiment, a larger space 56 for retaining the adhesive between the frame member main body section 18 and the support body 20 is formed thereby to allow a large amount of adhesive to be supplied between the frame member 16 and the support body 20. Additionally, the frame member main body section 18 is integrally formed at its side surface with a longitudinally extending projecting section 58 which is brought into contact with the support body 20 as shown when assembled with the support member 20. This projecting section 58 functions to prevent the adhesive 20 to move upwardly along the side surface 18c and serves as an auxiliary seal between the frame member 16 and the support body 20.

FIG. 9 illustrates a fifth embodiment of the window assembly according to the present invention, similar to the fourth embodiment. In this embodiment, the frame member flange-like section 4 is formed at its backside surface with a groove (no numeral) located at the base part thereof, i.e., at the same position of the groove 50 in FIG. 5. A spring material 60 having spring-elasticity is disposed integral with the inner surface of the groove. Additionally, the decorative or reinforcement member 28 is embedded in the frame member main body section 18 in such a manner that its outer surface is exposed. The projection or engaging rib section 26 is formed with a fitting portion 26a fittable within a through-hole 62 formed in the support body 12. As shown, the tip end portion of the projection 26 is formed slightly larger to be prevented from easily getting off from the through-hole 62. Additionally, the projection 26 is formed at its middle part with an enlarged portion 26b serving as a stop which is brought into contact with the support body 12. By virtue of the thus formed projection 26, the frame member 16 is press-fitted to the support body 12 by inserting the projection 26 into the support body through-hole 62. It will be understood that the spring material 60, the decorative or reinforcement member 28 and the like may not be jointly used, and therefore each of them may be used independently.

Figure 10:
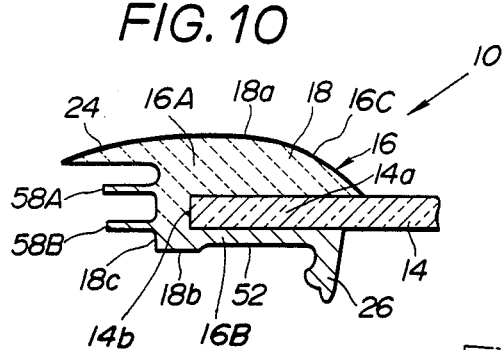
FIG. 10 is a fragmentary sectional view of a sixth embodiment of the window assembly along a vertical plane on which a frame member projection resides.
Figure 11:
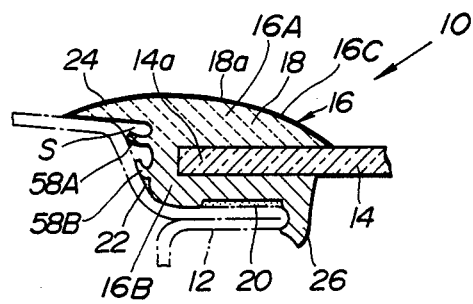
FIG. 11 is a fragmentary sectional view of the sixth embodiment of the window assembly of FIG. 10 in a state the window assembly is installed to the support body.

FIG. 10 illustrates a sixth embodiment of the window assembly 10 according to the present invention, similar to the first embodiment of FIGS. 1 and 2. In this embodiment, the frame member 16 is formed of foam plastic, in which the upper part 16A approximately relative to a plane containing a center plane of the transparent plate member 14 is formed of the foam material having a relatively high degree of foaming, while the lower part 16B approximately relative to the above-mentioned plane is formed of the foam plastic having a relatively low degree of foaming. In other words, the upper part 16A is lower in density than the lower part 16B. Additionally, the outer surface layer 16C of the frame member 16 is formed into a skin layer which is higher in density than the lower part 16B and relatively rigid. This skin layer 16c may be formed by controlling injection pressure of the plastic, surface contact of the plastic to the mold 36, temperature of the mold 36 and the like. In this embodiment, the frame member main body section 18 is integrally formed at its side surface with two projecting sections 58A, 58B which are generally parallel with each other. Each projecting section 58A, 58B is plate-shaped and extends in the longitudinal direction of the frame member 16. The projecting sections 58A, 58B will be brought into contact with the surface of the support body 12 upon being bent when the frame member 16 is installed to support body 12 as shown in FIG. 11. Additionally, the backside surface of the frame member flange-like section 24 is formed uneven or depressed to improve sealing ability of the flange-like section 24 to the surface of the support body 12.

Figure 12:
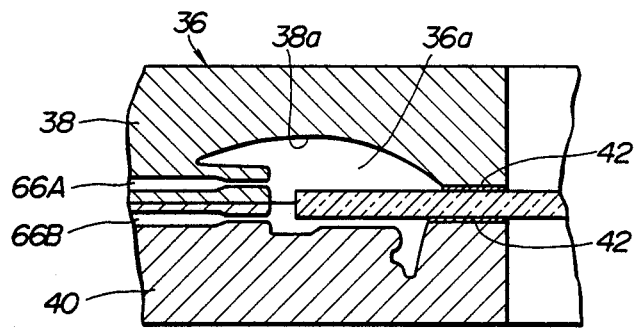
FIG. 12 is a fragmentary sectional view showing a method of producing the sixth embodiment in accordance with the present invention in a state a transparent plate member is set in a mold and immediately before injection of molten plastic.

Production of the window assembly 10 of this embodiment is carried out with an arrangement shown in FIG. 12 according to a method similar to that with the arrangement of FIG. 3. As shown in FIG. 12, the mold 36 is provided with upper and lower injection openings 66A, 66B located on a vertical plane indicated. In this embodiment, the upper injection opening 66A communicates with a part of the mold cavity 36a corresponding to the projecting section 58A of the frame member 16, while the lower injection opening 66B communicates with a part of the mold cavity 36a corresponding to the projecting section 58B of the frame member 16. It will be understood that the relatively high foaming degree foam plastic is injected through the upper injection opening 66A to the mold cavity 36a, while the relatively low foaming degree foam plastic is injected through the lower injection opening 66B into the mold cavity 36a. The upper and lower injection openings 66A, 66B are formed at several locations along the whole outer periphery of the plate member 14 though not shown. The upper and lower molds 38, 40 of the mold 36 are controlled in temperature to be maintained at suitable temperatures, taking account of thermal shock to the transparent plate member 14, foaming of the plastic, formation of the skin layer 16C and the like. It will be appreciated that the plastic or its raw materials may be injected into the mold cavity 36a through only one injection opening or a plurality of injection openings.

With this embodiment, the frame member 16 is formed of a plurality of materials having different physical properties, thereby providing a variety of window assemblies suitable for various purposes. For example, by selecting materials having different foaming degrees or densities respectively for the upper part 16A including the flange-like section 24 and the lower part 16B including the projection 26, the transparent plate member 14 is elastically supported while effectively absorbing impact energy applied to the window assembly 10, thereby softening impact load of a vehicle passenger against a windshield glass during collision of an automotive vehicle in case the window assembly 10 is a windshield assembly of the automotive vehicle. Furthermore, the above-mentioned enables the window assembly 10 to flexibly cope with dispersion in surface inclination precision, unevenness due to distorsion or the like of the window assembly 10 and the frame section of the automotive vehicle outer panel (support body), thereby improving sealing, adhesion and securing abilities. This improves liquid-tight seal and air-tight seal of the window assembly 10 relative to the support member 12, while suppressing generation of stress in the window assembly 10. Moreover, the frame member 16 prevents the plate member (plate glass) from being scratched, damaged or broken. The above-mentioned skin layer 16C improves appearance of the window assembly 10.

Figure 13:
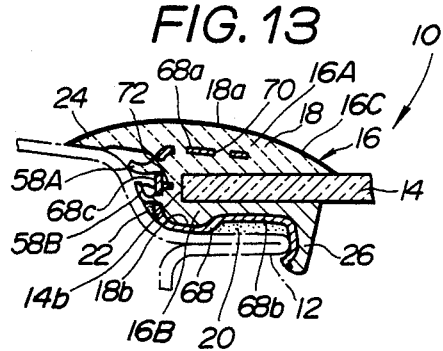
FIG. 13 is a fragmentary sectional view similar to FIG. 11 but showing a seventh embodiment of the window assembly according to the present invention.

FIG. 13 illustrates a seventh embodiment of the window assembly 10 according to the present invention, similar to the sixth embodiment of FIGS. 10 and 11 except for a spring structure or material 68 integrally molded with the frame member 16. The spring structure 68 serves as a reinforcement member of the window assembly 10 and includes an upper section 68a embedded in the frame member 16 and a lower section 68b formed along and secured to the backside surface 18b of the frame member main body section 18. The spring structure upper section 68a is formed with through-holes 72 filled with the plastic. The middle section 68c of the spring structure 68 is provided with a partition member 72 for separating the two kinds of plastics for the upper and lower parts 16A, 16B of the frame member 16.

Figure 14:
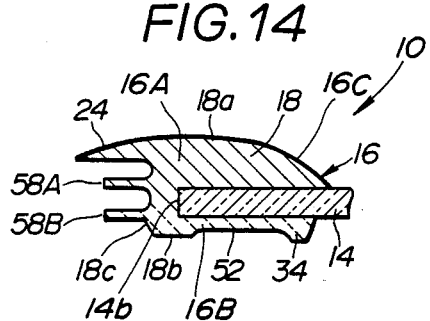
FIG. 14 is a fragmentary sectional view similar to FIG. 10 but showing an eighth embodiment of the window assembly according to the present invention.

FIG. 14 illustrates an eighth embodiment of the window assembly 10 according to the present invention, similar to the sixth embodiment of FIG. 10 with the exception that the frame member upper part 16A is formed of the foam plastic having a relatively low degree of foaming while the frame member lower part is formed of the foam plastic having a relatively high degree of foaming. In this embodiment, the projection 26 shown in the sixth embodiment is omitted so that the dam section 34 is formed extending in the longitudinal direction of the frame member 16, thereby saving the amount of plastic for the frame member 16. It will be understood that the projection 26 as shown in the sixth embodiment may be provided to the frame member 16 as occasion demands.

While the frame member 16 has been shown and described as being formed of the plastics having different foaming degrees, it will be understood that the frame member 16 may be formed of a plurality of materials which are different in other physical properties from each other.

FIGS. 15 and 16 illustrate a ninth embodiment of the window assembly 10 according to the present invention, similar to the first embodiment of FIGS. 1 to 3. In this embodiment, the decorative or reinforcement member 28 is adapted to cover the whole outer surface of the frame member 16. The decorative or reinforcement member 28 may be adapted to partly cover the outer surface of the frame member 16. The spring 32 is disposed between the decorative or reinforcement member 28 and a base member 76, passing through a through-hole 78 formed in the peripheral section of the transparent plate member 14. The diameter of the through-hole 78 is such that the spring 32 does not contact with the wall surface of the plate member 14 defining the through-hole 78. The through-hole 78 may be of shapes other than the shown and formed at one or more locations along periphery of the plate member 14. It is preferable to form the through-hole 78 on a vertical plane on which the projection or engaging rib section 26 reside from the view point of load applied to the window assembly 10; however, the spring 32 and the projection 26 may be separate from each other in the peripheral direction of the plate member 14.

The spring 32 and the base member 76 are integrally molded with or inserted in the frame member 16, in which the base member 76 is inserted in such a manner as to be exposed. A spring mechanism including the spring 32 and the base member 76 is located at one or more positions along the periphery of the plate member 14. The backside surface of the flange-like or tongue-like section 24 is formed uneven or depressed to improve sealing ability thereof relative to the support member 12. The frame member main body section 18 is formed at its side surface with the projecting sections 58A, 58B which are brought into contact with the support body 12 upon being bent when the window assembly 10 is installed to the support body 12 as shown in FIG. 17. As indicated in phantom in FIG. 17, the base member 76 may be secured to the support body 12 by a bolt passing through the support body 12.

Production of the window assembly 10 of this embodiment is carried out with an arrangement shown in FIG. 18 similarly to the production method in the first embodiment of FIGS. 1 to 3. That is to say, after the plate member 14 is suitably mounted through the sealing member 42 on the lower mold 40, the spring 32 is inserted into each through-hole 78 of the plate member 14 and interposed between the decorative or reinforcement member 28 and the base member 76 in such a manner that the decorative or reinforcement member 28 is pressed against the cavity inner surface of the upper mold 38 while the base member 76 is pressed against the cavity inner surface of the lower mold 40. Thereafter, the upper mold 38 is lowered to contact through the sealing member 42 with the plate member 14 and clamped to be put into the state shown in FIG. 18, thereby completing setting immediately before injection of molten plastic or its raw materials into the mold cavity 36a. The upper and lower molds 38, 40 are adapted to be controlled in temperature to be kept in appropriate temperatures, so that thermal shock to the transparent plate member and thermal influence to the plastic are minimized. The molted plastic or its raw materials is injected to the mold cavity 36a through one or more inlet openings formed in the mold 36.

FIG. 19 to 21 illustrate a tenth embodiment of the window assembly according to the present invention, similar to the ninth embodiment of FIGS. 15 to 18. In this embodiment, the frame member 16 is formed in its main body section 18 with a through-hole 82 which pierces from the outer surface 18a to the backside surface 18b of the main body section 18. Additionally, the through-hole 82 passes through the through-hole 78 of the transparent plate member 14. In other words, the through-holes 82, 78 are arranged coaxial with each other. The inner peripheral surface of the through-hole 82 is separate from the inner peripheral surface of the through-hole 78 so that the plate member 14 is not exposed within the through-hole 82. The through-hole 82 is enlarged at its lower end part to form an enlarged portion 82a opened to the main body section backside surface 18b.

The structure shown in FIGS. 19 and 20 is incorporated with the decorative or reinforcement member 28, the spring 32 and a fastening member 84 to form the window assembly 10. The spring 32 is disposed within the through-hole 82 and interposed between the fastening member 84 and the decorative or reinforcement member 28. The fastening member 84 is fitted in the through-hole enlarged portion 82a. The decorative or reinforcement member 28 is fixedly secured to outer surface of the frame member 16. In a state shown in FIG. 21 in which the window assembly 10 is installed to the support body 12 such as an automotive vehicle body outer panel, the frame member main body section back side surface 18b and the fastening member 84 are fixedly bonded to the support body 12 with the adhesive 20. The fastening member 84 may be fixed by a bolt (not identified) screwed in a through-hole 12d of the support body 12. As seen from FIG. 21, the plastic exists between the through-hole inner peripheral surface of the plate member 14 and the spring 32 so that the plate member 14 is separate from the spring 32.

The structure shown in FIGS. 19 and 20 is produced by an arrangement of FIG. 22 in a method similar to that by the arrangement of FIG. 3. In the arrangement of FIG. 22, the upper mold 38 is provided with a generally cylindrical projection 86 protruding into the mold cavity 36a. The lower mold 40 is provided with a generally cylindrical projection 88 protruding into the mold cavity 36a. The projections 86, 88 are arranged to be aligned with each other. Accordingly, after the plate member 14 is mounted on the lower mold 40 in such a position that the projection 88 of the lower mold 40 is inserted into the plate member through-hole 78, the upper mold 38 is lowered into a position shown in FIG. 22 in which the projection 86 of the upper mold 38 is inserted into the plate member through-hole 78 so as to be brought into press contact with the lower mold projection 88 through the sealing member 42. The diameter of the projections 86, 88 is smaller than that of the plate member through-hole 78, and therefore an annular space is formed between the peripheral surface of the plate member through-hole 78 and the outer peripheral surface of the aligned projections 86, 88. Thus, setting immediately before injection of the molten plastic or its raw materials is completed, in which the mold cavity 36a including the above-mentioned annular space around the aligned projections 86, 88 is defined. When the molten plastic or the like is injected into the mold cavity 36a, the structure of FIGS. 19 and 20 is obtained in which the aligned projections 86, 88 corresponds to the through-hole 82 of the frame member main body section 18.

Thus, according to the tenth embodiment window assembly 10, the frame member 16 is formed with the through-hole 82 which passes through the plate member 14. This through-hole 82 can be utilized for a variety of purposes, thereby extending the function of the window assembly 10. In case the spring 32 is disposed in the through-hole 82 as discussed above, the spring 32 is independent from the frame member 16 and therefore can exhibit a sufficient biasing force or supporting force. This enables sufficient soft and elastic plastic to be selected as the material of the frame member 16. Accordingly, the transparent plate member 14 is flexibly supported through the support member 16 to the support body 12, thereby effectively absorbing impact energy so as to soften the impact energy of a vehicle passenger striking against a windshield (the plate member) during vehicle collision. Furthermore, installation of the window assembly 10 to the support body such as the automotive vehicle body outer panel, fixing operation of the window assembly and adhesive applying operation can be simultaneously accomplished only in a single step, for example, by means of a robot provided with a fixing mechanism and an adhesive applying mechanism a part of which may be inserted into the through-hole 82 of the frame member 16. In this connection, such installation is hitherto accomplished by carrying out adhesive applying operation and thereafter fixing operation.

FIG. 23 illustrates an essential part of an eleventh embodiment of the window assembly 10 according to the present invention, similar to the structure of FIG. 19 with the exception that the spring structure or material 68 is integrally molded with the frame member 16 in order to reinforce the structure including the plate member 14 and the frame member 16. In this embodiment, the spring structure 68 is secured to the frame member main body section 18 along the side and backside surfaces 12b, 12a.

FIG. 24 illustrates a twelfth embodiment of the window assembly according to the present invention, similar to the tenth embodiment. In this embodiment, a hollow cylindrical member 90 is disposed in the frame member main body section 18 in such a manner as to extend from the outer surface 18a to the backside surface 18b of the main body section 18 and to pass through the through-hole 78 of the plate member 14. In this embodiment, the cylindrical member 90 fits in the plate member through-hole 78 and is interposed between the fastening member 84 and the decorative or reinforcement member 28. Thus, the through-hole 82 extending through the frame member 16 and the plate member 14 is defined. The spring 32 is disposed within the through-hole 82 and interposed between the fastening member 84 and the decorative or reinforcement member 28.

While explanation of the present invention has been made mainly to the window assembly (windshield assembly) of the automotive vehicle, it will be appreciated that the present invention may be extensively applicable to other window assemblies in other vehicles, architectural structures, ships, a variety of apparatus and the like.

What is claimed is:

1. A window assembly to be installed to a support body, said window assembly comprising:
   a transparent plate member;
   a frame member made of plastic and integrally formed with a peripheral section of said plate member so that said plate member peripheral section is inserted in said frame member, said frame member including
   means for accomplishing location of said frame member relative to the support body and for allowing said frame member to be fitted with the support body,
   means for allowing at least a part of said frame member to tightly contact with a surface of the support body,
   means defining a space for adhesive between said frame member and the support body,
   a rigid member fixedly secured to said frame member, and
   a coil spring disposed in said frame member and located to contact with said rigid member.

2. A window assembly to be installed to a support body, said window assembly comprising:
   a transparent plate member; and
   a frame member made of plastic and integrally molded with a peripheral section of said plate member so that said plate member peripheral section is inserted in said frame member, said frame member including
   a main body section in which said plate member peripheral section is inserted,
   a flange-like section formed integral with said main body section, said flange-like section extending along the length of said frame member and having a surface to be in tight contact with a surface of the support body,
   means defining a space for adhesive between said main body section and the support body,
   a rigid member fixedly secured to said frame member, and
   a coil spring disposed in said frame member and located to contact with said rigid member.

3. A window assembly as claimed in claim 2, further comprising a projection formed integral with and projecting from said main body section, said projection being to be fitted with the support body.

4. A window assembly as claimed in claim 2, wherein said flange-like section extends generally parallel with said plate member.

5. A window assembly as claimed in claim 3, wherein said projection extends generally perpendicular to said plate member.

6. A window assembly as claimed in claim 2, further comprising a spring disposed in said frame member main body section.

7. A window assembly as claimed in claim 6, further comprising a rigid member secured to outer surface of said frame member.

8. A window assembly as claimed in claim 7, wherein said rigid member is integrally molded with said frame member main body section and located exposed to the outer surface of said frame member main body section, wherein said spring is disposed between said rigid member and said plate member.

9. A window assembly as claimed in claim 8, further comprising a spring mount member disposed on said plate member, wherein said spring is disposed between said rigid member and said spring mount member.

10. A window assembly as claimed in claim 2, further comprising means defining a first through-hole in said plate member, and means defining a second through-hole in said frame member main body section, said second through-hole being in alignment with said first through-hole of said plate member.

11. A window assembly as claimed in claim 10, further comprising a rigid member secured to outer surface of said frame member main body section.

12. A window assembly as claimed in claim 2, further comprising means defining a groove formed on surface of said flange-like section, said groove being located around a base part of said flange-like section integral with said main body section, said groove extending in longitudinal direction of said frame member.

13. A window assembly as claimed in claim 12, wherein said groove is formed on a first surface at least a part of which contacts with said support body.

14. A window assembly as claimed in claim 13, further comprising a spring material securely disposed within said groove.

15. A window assembly as claimed in claim 12, wherein said groove is formed on a second surface which is generally flush with outer surface of said main body section.

16. A window assembly as claimed in claim 2, wherein said frame member includes first and second parts which are integral with each other and formed of first and second materials, respectively, which are different in physical property from each other.

17. A window assembly as claimed in claim 16, wherein said first and second parts are located on opposite sides of said plate member.

18. A window assembly as claimed in claim 17, wherein said first and second materials are different in density.

19. A window assembly as claimed in claim 16, wherein said frame member includes an outer surface part including at least a part of outer surface of said frame member, said outer surface part is formed of a third material which is higher in density than said first and second material.

20. A window assembly as claimed in claim 2, further comprising at least one projecting section which is brought into contact with said support body to maintain seal between said frame member and said support body.

21. A window assembly as claimed in claim 2, further comprising a spring structure integrally molded with said frame member.

22. A window assembly as claimed in claim 2, further comprising means by which said frame member is press-fitted to said support body.

23. A window assembly as claimed in claim 22, wherein said means includes a projection integral with said frame member main body section which is fittable in a hole formed in the support body.

24. A window assembly as claimed in claim 2, wherein said window assembly is to be installed to an automotive vehicle body outer panel.

25. A window assembly to be installed to a support body, said window assembly comprising:
a transparent plate member;
a frame member made of plastic and integrally formed with a peripheral section of said plate member so that said plate member peripheral section is inserted in said frame member, said frame member being molded together with said transparent plate member by molten plastic injected into a cavity of a mold in which said transparent plate member is disposed, said frame member including
means for accomplishing location of said frame member relative to the support body and for allowing said frame member to be fitted with the support body,
means for allowing at least a part of said frame member to tightly contact with a surface of the support body,
means defining a space for adhesive between said frame member and the support body,
a rigid member fixedly secured to said frame member, said rigid member being located within said mold cavity during molding of said frame member, and
a coil spring disposed in said frame member and located to contact with said rigid member, said coil spring being located within said mold cavity so as to contact with said rigid member during molding of said frame member so that said coil spring biases said rigid member to tightly contact with an inner surface of said mold cavity.

26. A window assembly to be installed to a support body, said window assembly comprising:
a transparent plate member,
a frame member made of plastic and integrally molded with a peripheral section of said plate member so that said plate member peripheral section is inserted in said frame member, said frame member including
a main body section in which said plate member peripheral section is inserted,
a flange-like section formed integral with said main body section, said flange-like section extending along the length of said frame member and having a surface to be in tight contact with a surface of the support body,
means defining a space for adhesive between said main body section and the support body,
a rigid member secured to an outer surface of said frame member, and a spring disposed in said frame member body section,
means defining a through-hole in said plate member so that said spring extends through said plate member through-hole to connect with said rigid member.

27. A window assembly as claimed in claim 26, further comprising a base member integrally molded with said frame member main body section and exposed to outer surface of said frame member main body section, wherein said spring is interposed between said rigid member and said base member.

28. A window assembly to be installed to a support body, said window assembly comprising:
a transparent plate member; and
a frame member made of plastic and integrally molded with a peripheral section of said plate member so that said plate member peripheral section is inserted in said frame member, said frame member including
a main body section in which said plate member peripheral section is inserted,
a flange-like section formed integral with said main body section, said flange-like section extending along the length of said frame member and having a surface to be in tight contact with a surface of the support body,
means defining a space for adhesive between said main body section and the support body,
means defining a first through-hole in said plate member, and means defining a second through-hole in said frame member main body section, said second through-hole being in alignment with said first through-hole of said plate member,
a rigid member secured to an outer surface of said frame member main body section, and
a spring disposed within said second through hole and extending to connect with said rigid member.

29. A window assembly as claimed in claim 28, further comprising a hollow cylindrical member disposed in said second through-hole, said spring being disposed inside said hollow cylindrical member.

* * * * *